(12) United States Patent
Duan et al.

(10) Patent No.: US 12,432,144 B2
(45) Date of Patent: Sep. 30, 2025

(54) GLOBAL VISIBILITY FOR VIRTUAL PRIVATE NETWORK (VPN) CONDITIONS FOR ROUTING OPTIMIZATIONS

(71) Applicant: Fortinet, Inc., Sunnyvale, CA (US)

(72) Inventors: Shangwei Duan, Vancouver (CA); Wang Xi, Vancouver (CA); Dmitry Perets, Bologna (IT); Yong lin Han, Surrey (CA); Pin Yi Kuo, Burnaby (CA); Scott Parker, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/603,530

(22) Filed: Mar. 13, 2024

(65) Prior Publication Data

US 2024/0291760 A1 Aug. 29, 2024

Related U.S. Application Data (63) Continuation-in-part of application No. 17/566,801, filed on Dec. 31, 2021.

(51) Int. Cl.
*H04L 45/76* (2022.01)
*H04L 45/12* (2022.01)

(52) U.S. Cl.
CPC ............ *H04L 45/76* (2022.05); *H04L 45/123* (2013.01)

(58) Field of Classification Search
CPC ........ H04L 45/123; H04L 45/76; H04L 45/70
See application file for complete search history.

(56) References Cited

U.S. PATENT DOCUMENTS

| 7,447,901 | B1 | 11/2008 | Sullenberger |
| 7,848,335 | B1 | 12/2010 | Kang |
| 11,329,883 | B2 * | 5/2022 | Zhang ................. H04L 12/4641 |
| 11,451,484 | B2 | 9/2022 | Bajaj |
| 11,824,754 | B2 * | 11/2023 | Magnezi ............. H04L 12/4633 |
| 2003/0177221 | A1 * | 9/2003 | Ould-Brahim ...... H04L 63/0272 709/223 |
| 2011/0004913 | A1 * | 1/2011 | Nagarajan ............ H04L 63/102 726/1 |

(Continued)

OTHER PUBLICATIONS

C. Kaufman et al., Internet Key Exchange Protocol Version 2 (IKEv2), Standards Track, Oct. 14, 2014, RFC 7296, 142 pages.

(Continued)

*Primary Examiner* — Schquita D Goodwin
*Assistant Examiner* — Linh T. Nguyen
(74) *Attorney, Agent, or Firm* — Law Office of Dorian Cartwright; Dorian Cartwright (57) ABSTRACT

A local spoke is configured with a hub that serves at least one remote spoke equipped with a plurality of IPSEC endpoint interfaces for routing traffic according to a routing table of the hub. A first routing path is received to the at least one remote spoke for dynamic VPN with a first IPSEC endpoint selected by the hub based on a Reply message without consideration of first link quality of the remote spoke relative to other available links. In another embodiment, an ADVPN shortcut is established. Data packets are then transmitted using a second routing path for dynamic VPN with a second IPSEC endpoint. A new ADVPN shortcut is established for more optimal routing, based on updated link quality metrics discovered during a health check. The existing ADVPN shortcut is then allowed to expire.

8 Claims, 6 Drawing Sheets

(56) References Cited

U.S. PATENT DOCUMENTS

| | | | |
|---|---|---|---|
| 2014/0380460 A1* | 12/2014 | Bhalerao | H04L 63/20 |
| | | | 726/14 |
| 2016/0261506 A1* | 9/2016 | Hegde | H04L 45/025 |
| 2017/0230199 A1 | 8/2017 | Shen et al. | |
| 2019/0052658 A1 | 2/2019 | Clarke | |
| 2019/0140955 A1 | 5/2019 | Hemige et al. | |
| 2020/0336464 A1* | 10/2020 | Hastings | H04L 9/0841 |
| 2021/0036887 A1 | 2/2021 | Meng et al. | |
| 2021/0067442 A1 | 3/2021 | Sundararajan | |
| 2021/0168125 A1 | 6/2021 | Vemulpali | |
| 2021/0306247 A1* | 9/2021 | Duan | H04L 43/10 |
| 2021/0352151 A1 | 11/2021 | Gupta | |
| 2023/0029882 A1 | 2/2023 | Hooda et al. | |
| 2023/0059537 A1* | 2/2023 | Gavand | H04L 67/1006 |
| 2023/0216733 A1 | 7/2023 | Bevan et al. | |
| 2024/0015529 A1 | 1/2024 | Xu | |
| 2024/0291760 A1 | 8/2024 | Duan et al. | |

OTHER PUBLICATIONS

F. Audet, ED. et al., Network Address Translation (NAT) Behavioral Requirements forUnicast UDP, Best Current Practice, Audet & Jennings, Jan. 2007, 29 pages.

* cited by examiner

GLOBAL VISIBILITY FOR VIRTUAL PRIVATE NETWORK (VPN) CONDITIONS FOR ROUTING OPTIMIZATIONS

CROSS-REFERENCE TO RELATED APPLICATIONS

The present invention is related as a continuation-in-part under 120 (e) to U.S. application Ser. No. 17/566,801, filed Dec. 31, 2021 and entitled DISTRIBUTED NODE DISCOVERY AND OVERLAY PATH MANAGEMENT ON A DATA COMMUNICATION NETWORK.

FIELD OF THE INVENTION

The invention relates generally to computer networks, and more specifically, for global visibility of virtual private network (VPN) conditions for routing optimization.

BACKGROUND

Dynamic VPN solutions like Cisco DMVPN (Dynamic Multipoint VPM) and Fortinet ADVPN (Auto Discovery VPN) face a major challenge due to their limited capability in adapting to changing link quality at remote sites. This limitation arises from their dependence on local information, such as routing and quality metrics, which results in a lack of awareness about the link quality conditions at the remote site. This issue leads to a decrease in the effectiveness and efficiency of these solutions, negatively impacting both user experience and overall business performance.

Consequently, there is an increasing need for a new solution that integrates information from both local and remote sites to overcome this limitation. What is needed is a robust technique for global visibility of VPN conditions to optimize routing.

SUMMARY

To meet the above-described needs, methods, computer program products, and systems for global visibility of virtual VPN conditions for routing optimization.

In one embodiment, a local spoke is configured with a hub that serves at least one remote spoke equipped with a plurality of IPSEC (Internet Protocol Security) endpoint interfaces for routing traffic according to a routing table of the hub. A first routing path is received to the at least one remote spoke for dynamic VPN with a first IPSEC endpoint selected by the hub based on a Reply message without consideration of first link quality of the remote spoke relative to other available links.

In another embodiment, an ADVPN shortcut is established. In more detail, responsive to receiving an Offer message by the local spoke from the hub, a Query message is sent to the hub that is directed to the at least one remote spoke. A Reply message is then received by the local spoke from the hub forwarded from the at least one remote spoke. The Reply message comprises available IPSEC endpoint interfaces along with link quality metrics for each of the available IPSEC interfaces. Responsive to the local spoke selecting a second IPSEC endpoint based on link quality, an ADVPN negotiation process is enabled to update the selection at the remote spoke. Data packets are then transmitted using a second routing path for dynamic VPN with a second IPSEC endpoint.

In still another embodiment, a new ADVPN shortcut is established for more optimal routing, based on updated link quality metrics discovered during a health check. The existing ADVPN shortcut is allowed to expire.

Advantageously, computer networks are improved with better performance from global visibility.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for global visibility of VPN conditions for routing optimization. The following disclosure is limited only for the purpose of conciseness, as one of ordinary skill in the art will recognize additional embodiments given the ones described herein.

I. Systems for VPN Routing Optimization (FIGS. 1-4)

Figure 1:
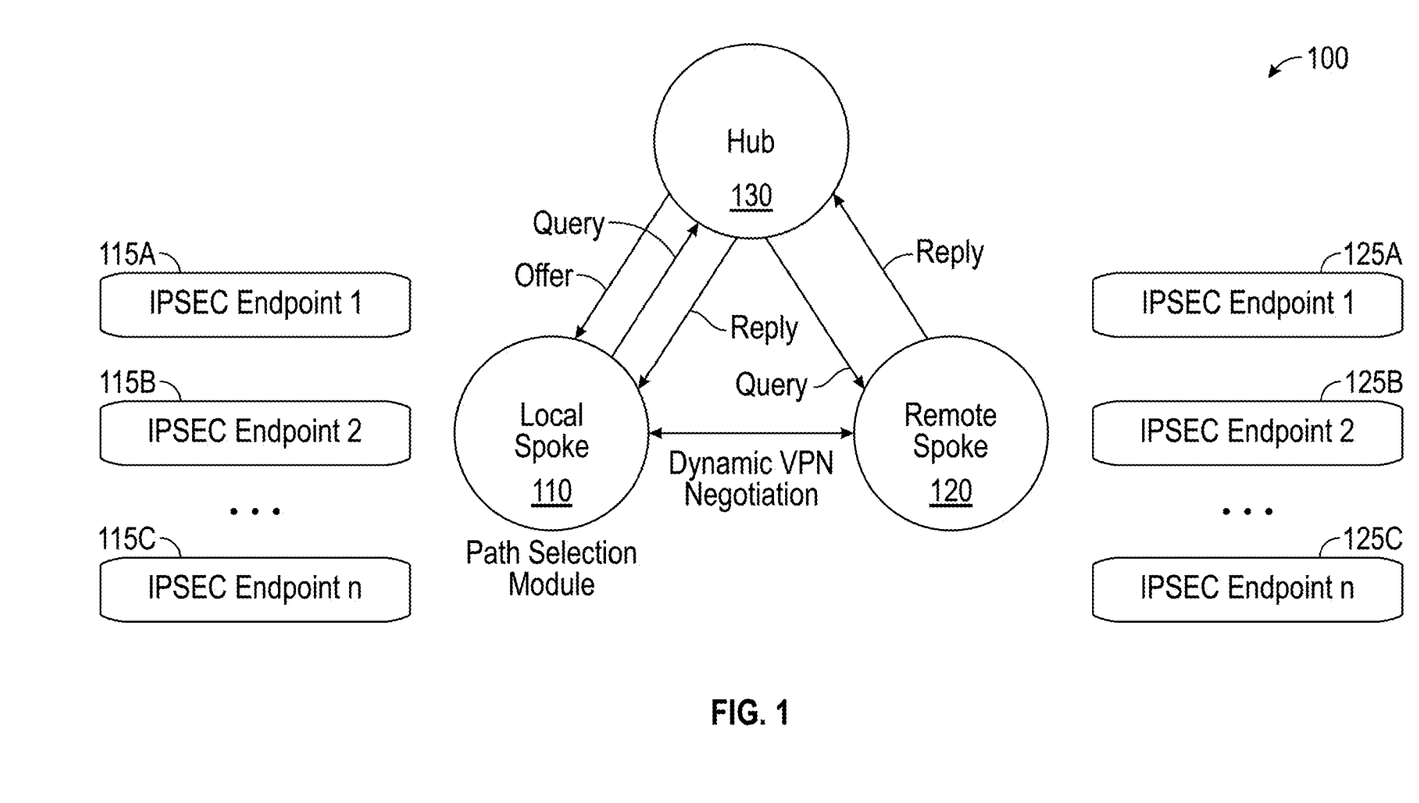
FIG. 1 is a block diagram illustrating ADVPN message exchange and negotiation in a system for global visibility of VPN conditions for routing optimization, according to some embodiments.
Figure 6:
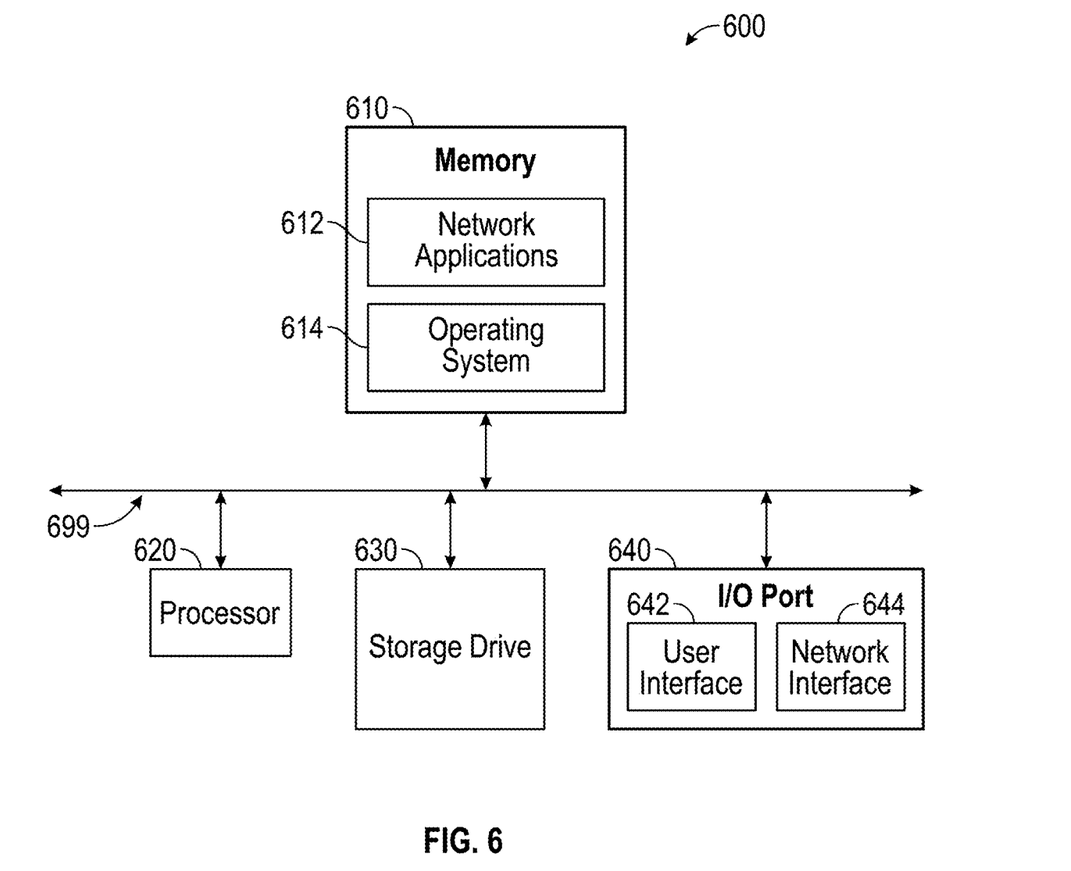
FIG. 6 is a block diagram illustrating an example computing device for the system of FIG. 1, according to one embodiment.

FIG. 1 is a high-level block diagrams illustrating a system 100 for global visibility of virtual private network (VPN) conditions for routing optimization, according to an embodiment. The system 100 includes a local spoke 110 and a remote spoke 120 both connected to a hub 130, over a data communication network 199. IPSEC endpoints 115A-C are communicatively coupled to the local spoke 110 and IPSEC endpoints 125A-C are communicatively coupled to the remote spoke 120. Other embodiments of system 100 can include additional components that are not shown in FIG. 1, such as routers, switches, network gateways, and firewalls, access points and stations. Further, there can be more local spokes, remote spokes, hubs, and IPSEC endpoints (e.g., there can be hundreds of IPSEC endpoints) in varying configurations. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., local spoke 110, remote spoke 120, hub 130 and IPSEC endpoints 115A-C, 125A-C). The components can also be connected via wireless networking (e.g., IPSEC endpoints and wireless stations). The data communication network 199 can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or Ipv6 address spaces. VPNs can initiated for communication between IPSEC endpoints over the data communication network 199. In general, IPSEC is a group of protocols often used to set up VPNs by encrypting IP packets, along with authenticating a source of the IP packets.

In one embodiment, as shown in FIG. 1, traffic from the local spoke 110 heading towards the remote spoke 120 is first routed to the hub 130 according to a routing table. The hub 130 then forwards this traffic to the remote spoke 120. Concurrently, the hub 130 sends an offer message to the local spoke 110. Upon receiving this offer, the local spoke 110 generates a query message directed to the remote spoke 120, which is relayed via the hub 130. The remote spoke 120, upon receiving the query, responds with a reply message that travels back along the same path. In this scenario, the hub 130 routing decision, which solely relies on the routing table, selects the gateway for the dynamic VPN at the remote spoke 120, without taking into account the quality of the available links.

With the ADVPN, the reply message can be enriched with details of all possible endpoint interfaces. This information encompasses IP addresses, gateway names, transport ID/Group, and link quality metrics such as latency, packet loss, jitter, service level agreement (SLA), bandwidth, mean opinion score (MOS), among others. Each set of information is uniquely associated with a site name to distinguish between multiple remote spokes.

Figure 2:
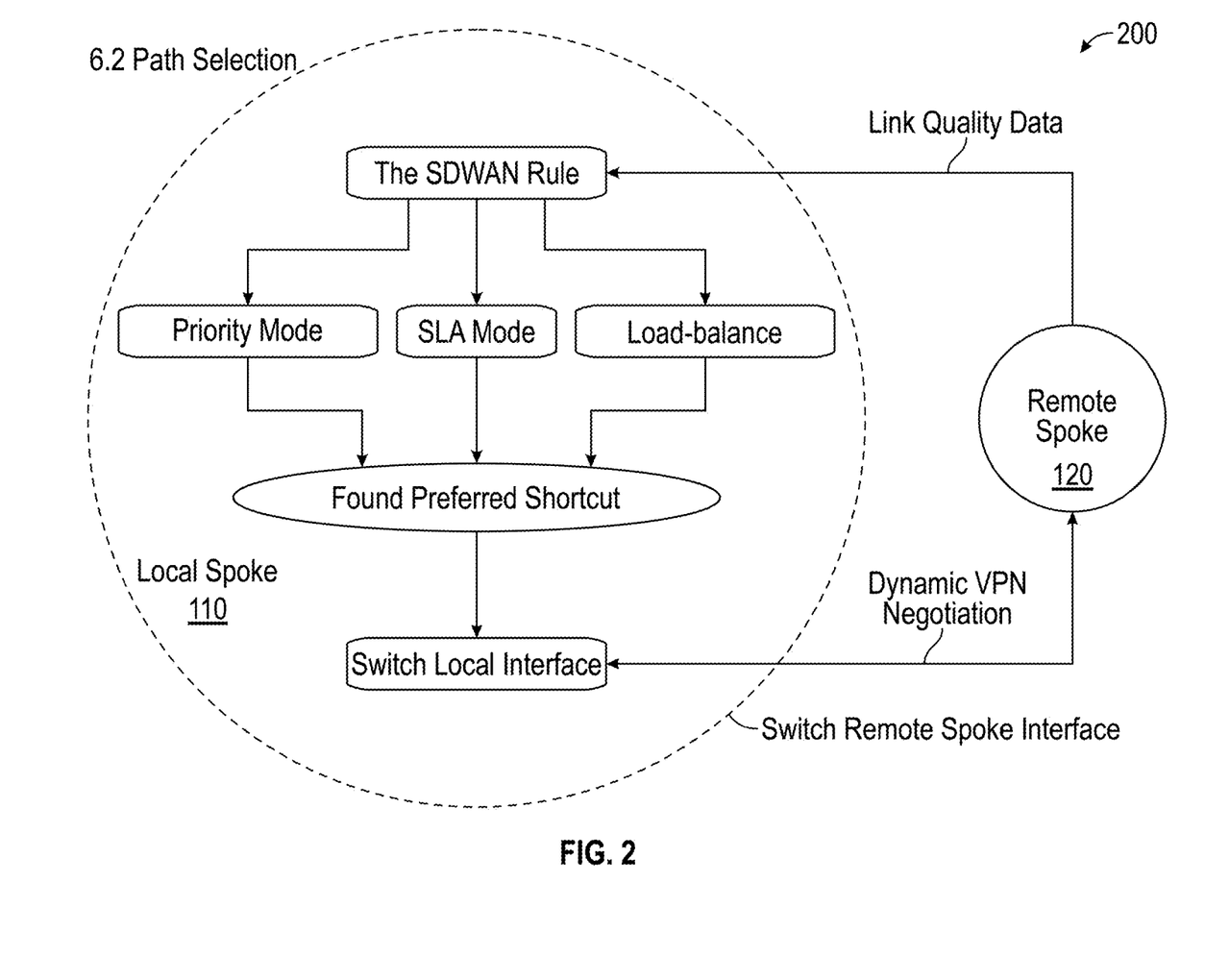
FIG. 2 is a block diagram illustrating path selection for the system of FIG. 1, according to one embodiment.

Regarding path selection, as outlined in an embodiment of FIG. 2, when the local spoke receives the link quality information from the remote spoke 120, a path selection module decides which remote IPSEC endpoint interface to use for establishing the dynamic VPN. If user traffic triggers a software-defined wide area network (SD-WAN) rule, this rule specifies the criteria for selecting the best link. In the absence of an SD-WAN rule hit, a default rule is applied. The name of the chosen remote IPSEC endpoint interface is incorporated into the standard negotiation message to initiate the ADVPN tunnel setup. On the remote spoke 120, if the selected IPSEC endpoint interface differs from the one initially identified by the hub 130, the ADVPN data structure is updated to reflect this new selection, enabling the commencement of the standard negotiation process. Many other variations are possible.

Figure 3:
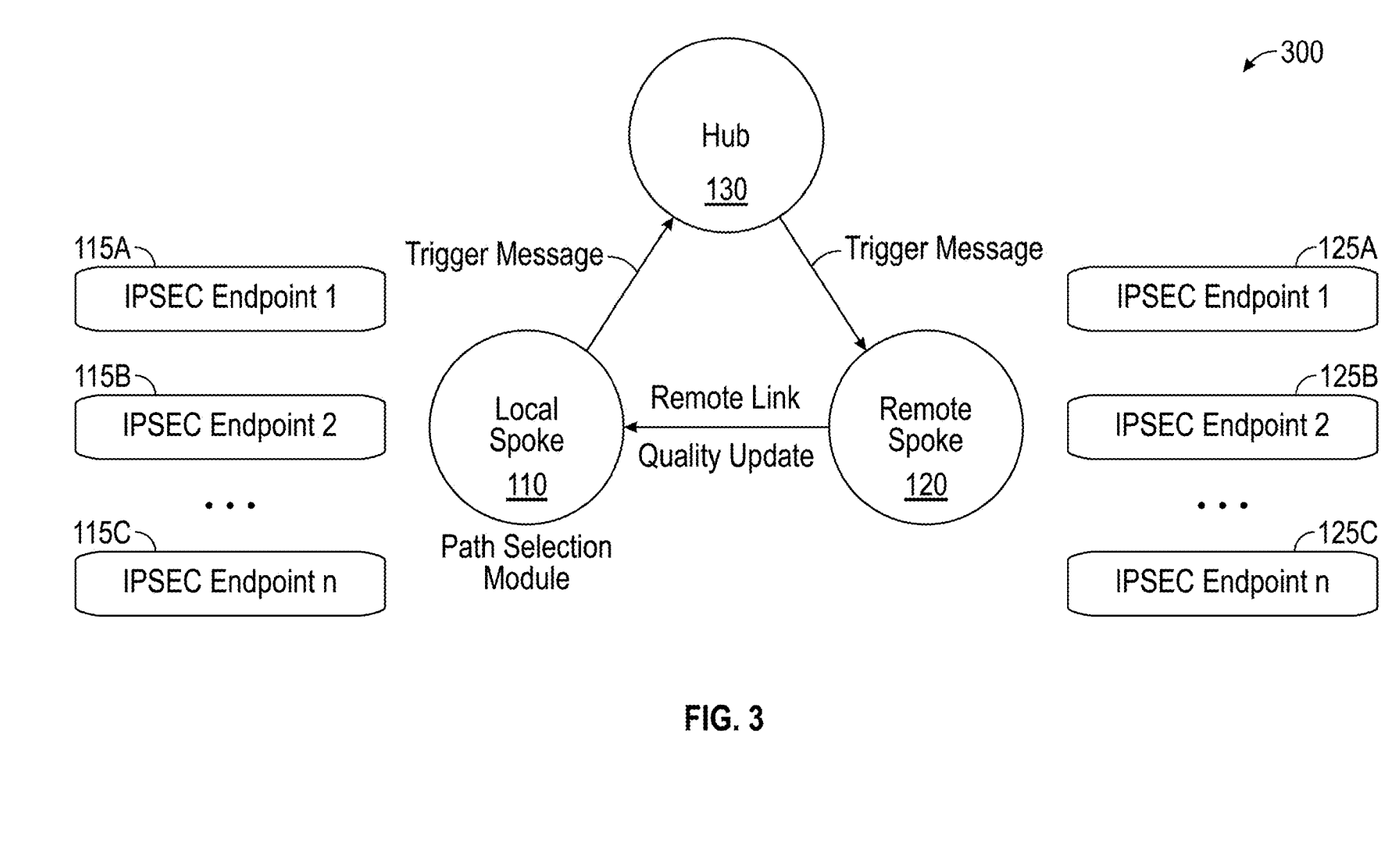
FIG. 3 is a block diagram illustrating an ADVPN remote quality update of the system of FIG. 1, according to one embodiment.

FIG. 3 illustrates that once the shortcut is established, in one embodiment, the remote spoke 130 will maintain updates to the local spoke 110. If a more optimal path is identified by the path selection module (e.g., after a health check showing a change in conditions), the local spoke 110 will initiate a trigger message. This message is sent from its preferred IPSEC endpoint interface to the corresponding interface on the remote spoke 120. As outlined in FIGS. 1 and 2, this triggers the formation of a preferred ADVPN shortcut. Concurrently, the initial ADVPN shortcut is allowed to expire naturally through an idle timeout process.

Figure 4:
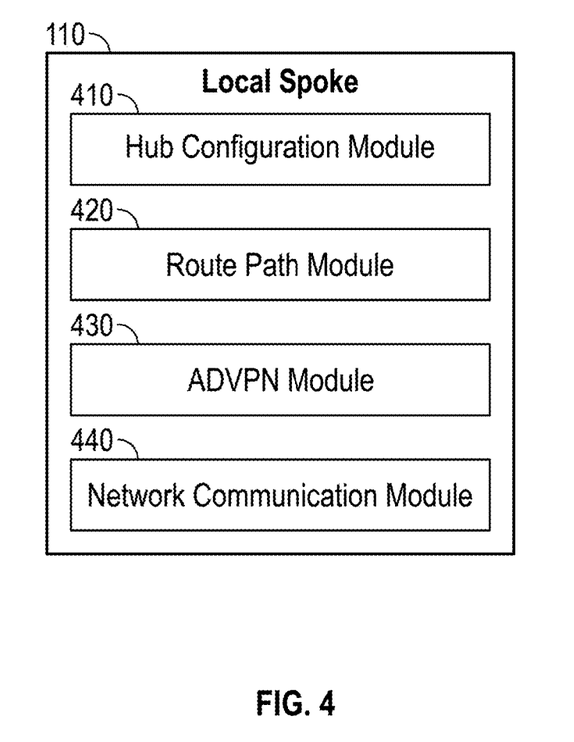
FIG. 4 is a block diagram illustrating a local spoke of the system of FIG. 1, according to an embodiment.

FIG. 4 is a more detailed block diagram illustrating the local spoke 110 of the system of FIG. 1, according to one embodiment. The deceptive proxy device 110 includes a hub configuration module 410, a route path module 420, an auto discovery ADVPN module 430 and a network communication module 440. The components can be implemented in hardware, software, or a combination of both.

The hub configuration module 410 sets up a local spoke with a hub that serves at least one remote spoke equipped with a plurality of IPSEC endpoint interfaces for routing traffic according to a routing table of the hub.

The route path module 420 can receive a first routing path to the at least one remote spoke for dynamic VPN with a first IPSEC endpoint selected by the hub based on a reply message without consideration of first link quality of the remote spoke relative to other available links.

The auto discovery ADVPN module 430 establishes an ADVPN shortcut. In one case, responsive to receiving an offer message by the local spoke from the hub, a query message is sent to the hub that is directed to the at least one remote spoke. A Reply message is received by the local spoke from the hub forwarded from the at least one remote spoke. The Reply message comprises available IPSEC endpoint interfaces along with link quality metrics for each of the available IPSEC interfaces, for example. Responsive to the local spoke selecting a second IPSEC endpoint based on link quality, an ADVPN negotiation process is enabled to update the selection at the remote spoke.

The network communication module 440 can transmit data packets using a second routing path for dynamic VPN with a second IPSEC endpoint.

II. Methods for VPN Routing Optimization (FIG. 5)

Figure 5:
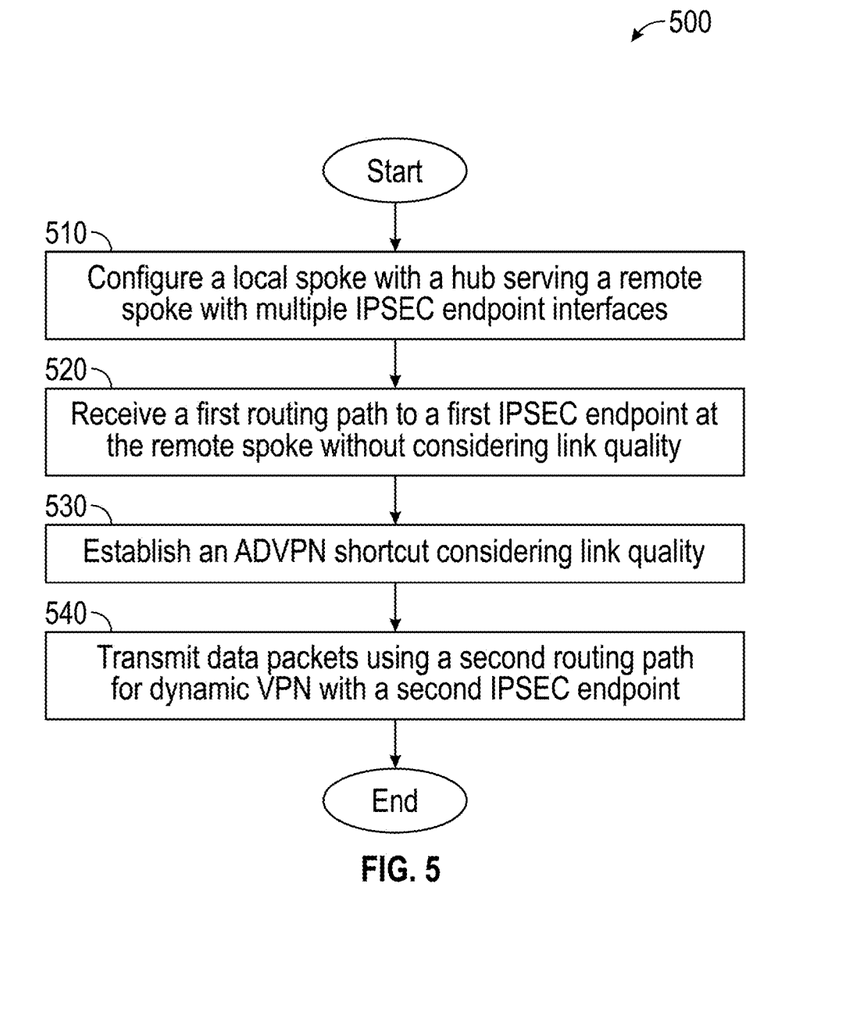
FIG. 5 is a high-level flow diagram illustrating a method for global visibility of virtual private network (VPN) conditions for routing optimization, according to an embodiment.

FIG. 5 is a high-level flow diagram of a method 500 for global visibility of VPN conditions for routing optimization, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 510, a local spoke is configured with a hub that serves at least one remote spoke equipped with a plurality of IPSEC endpoint interfaces for routing traffic according to a routing table of the hub.

At step 520, a first routing path is received to the at least one remote spoke for dynamic VPN with a first IPSEC endpoint selected by the hub based on a Reply message without consideration of first link quality of the remote spoke relative to other available links.

At step 530, an ADVPN shortcut is established. In more detail, responsive to receiving an Offer message by the local spoke from the hub, a Query message is sent to the hub that is directed to the at least one remote spoke. A Reply message is then received by the local spoke from the hub forwarded from the at least one remote spoke. The Reply message comprises available IPSEC endpoint interfaces along with link quality metrics for each of the available IPSEC interfaces. Responsive to the local spoke selecting a second IPSEC endpoint based on link quality, an ADVPN negotiation process is enabled to update the selection at the remote spoke.

At step 540, data packets are transmitted using a second routing path for dynamic VPN with a second IPSEC endpoint.

In still another embodiment, a new ADVPN shortcut is established for more optimal routing, based on updated link quality metrics discovered during a health check. The existing ADVPN shortcut is allowed to expire.

III. Computing Device for VPN Routing Optimization (FIG. 6)

FIG. 6 is a block diagram illustrating a computing device 600 for use in the system 100 of FIG. 1, according to one embodiment. The computing device 600 is a non-limiting example device for implementing each of the components of the system 100, including the local spoke 110, the remote spoke 120, the hub 130 and the IPSEC endpoints 115A-C, 125A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a local spoke, implemented at least partially in hardware and on a data communication network, for global visibility of virtual private network (VPN) conditions for routing optimization, the method comprising:
   configuring a local spoke with a hub that serves at least one remote spoke equipped with a plurality of IPSEC endpoint interfaces for routing traffic according to a routing table of the hub;
   receiving a first routing path to the at least one remote spoke for dynamic VPN with a first IPSEC endpoint selected by the hub based on a Reply message without consideration of first link quality of the remote spoke relative to other available links;
   establishing an auto discovery VPN (ADVPN) shortcut considering link quality comprising:
      responsive to receiving an Offer message by the local spoke from the hub, sending a Query message to the hub that is directed to the at least one remote spoke;
      receiving a Reply message by the local spoke from the hub forwarded from the at least one remote spoke, wherein the Reply message comprises available IPSEC endpoint interfaces along with link quality metrics for each of the available IPSEC interfaces;
      responsive to the local spoke selecting a second IPSEC endpoint based on link quality, enabling an ADVPN negotiation process to update the selection at the remote spoke; and
   transmitting data packets using a second routing path for dynamic VPN with a second IPSEC endpoint.

2. The method of claim 1, wherein the Reply message comprises IPSEC endpoints from a plurality of remote spokes.

3. The method of claim 1, wherein the link quality metrics of the Reply message include at least latency, packet loss and jitter.

4. The method of claim 1, wherein the link quality metrics of the Reply message include at least service level agreement (SLA), bandwidth and mean opinion score (MOS).

5. The method of claim 1, wherein the second IPSEC point is different from the first IPSEC point selected by the hub.

6. The method of claim 1, wherein the second IPSEC point is the same from the first IPSEC point selected by the hub.

7. A non-transitory computer-readable medium in a local spoke, implemented at least partially in hardware and on a data communication network, for global visibility of virtual private network (VPN) conditions for routing optimization, the non-transitory computer-readable medium comprising:
   configuring a local spoke with a hub that serves at least one remote spoke equipped with a plurality of IPSEC endpoint interfaces for routing traffic according to a routing table of the hub;
   receiving a first routing path to the at least one remote spoke for dynamic VPN with a first IPSEC endpoint selected by the hub based on a Reply message without consideration of first link quality of the remote spoke relative to other available links;
   establishing an auto discovery VPN (ADVPN) shortcut considering link quality comprising:
      responsive to receiving an Offer message by the local spoke from the hub, sending a Query message to the hub that is directed to the at least one remote spoke;
      receiving a Reply message by the local spoke from the hub forwarded from the at least one remote spoke, wherein the Reply message comprises available IPSEC endpoint interfaces along with link quality metrics for each of the available IPSEC interfaces;
      responsive to the local spoke selecting a second IPSEC endpoint based on link quality, enabling an ADVPN negotiation process to update the selection at the remote spoke; and
   transmitting data packets using a second routing path for dynamic VPN with a second IPSEC endpoint.

8. A local spoke for global visibility of virtual private network (VPN) conditions for routing optimization, the local spoke comprising:
   a processor;
   a network interface communicatively coupled to the processor and to a data communication network; and
   a memory, communicatively coupled to the processor and storing:
      a hub configuration module a local spoke with a hub that serves at least one remote spoke equipped with a plurality of IPSEC endpoint interfaces for routing traffic according to a routing table of the hub;
      a route path module to receive a first routing path to the at least one remote spoke for dynamic VPN with a first IPSEC endpoint selected by the hub based on a Reply message without consideration of first link quality of the remote spoke relative to other available links; and
      an auto discovery VPN (ADVPN) module to establish an ADVPN shortcut considering link quality to:
         responsive to receiving an Offer message by the local spoke from the hub, send a Query message to the hub that is directed to the at least one remote spoke;
         receive a Reply message by the local spoke from the hub forwarded from the at least one remote spoke, wherein the Reply message comprises available IPSEC endpoint interfaces along with link quality metrics for each of the available IPSEC interfaces; and
         responsive to the local spoke selecting a second IPSEC endpoint based on link quality, enable an ADVPN negotiation process to update the selection at the remote spoke; and
      transmitting data packets using a second routing path for dynamic VPN with a second IPSEC endpoint.

* * * * *